(12) United States Patent
Zhuo et al.

(10) Patent No.: US 11,385,805 B2
(45) Date of Patent: Jul. 12, 2022

(54) METHOD, ELECTRONIC DEVICE AND COMPUTER PROGRAM PRODUCT FOR MANAGING STORAGE UNIT

(71) Applicant: EMC IP Holding Company LLC, Hopkinton, MA (US)

(72) Inventors: Baote Zhuo, Beijing (CN); Jian Gao, Beijing (CN); Geng Han, Beijing (CN); Shaoqin Gong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 54 days.

(21) Appl. No.: 16/993,603

(22) Filed: Aug. 14, 2020

(65) Prior Publication Data

US 2021/0334014 A1 Oct. 28, 2021

(30) Foreign Application Priority Data

Apr. 22, 2020 (CN) .......................... 202010324002.1

(51) Int. Cl.
*G06F 3/00* (2006.01)
*G06F 3/06* (2006.01)
*G06F 11/14* (2006.01)

(52) U.S. Cl.
CPC .......... *G06F 3/0619* (2013.01); *G06F 3/0629* (2013.01); *G06F 3/0653* (2013.01); *G06F 3/0683* (2013.01); *G06F 11/1435* (2013.01)

(58) Field of Classification Search
None
See application file for complete search history.

(56) References Cited

U.S. PATENT DOCUMENTS

| | | | |
|---|---|---|---|
| 9,880,762 B1 | 1/2018 | Armangau et al. | |
| 10,037,369 B1 | 7/2018 | Bono et al. | |
| 10,678,641 B2 | 6/2020 | Bono et al. | |
| 10,860,483 B2 | 12/2020 | Fliess et al. | |
| 2003/0188101 A1* | 10/2003 | Fore ..................... | G06F 11/1096 711/114 |
| 2020/0133810 A1* | 4/2020 | Gao ...................... | G06F 3/0659 |

* cited by examiner

*Primary Examiner* — Midys Rojas
(74) *Attorney, Agent, or Firm* — BainwoodHuang (57) ABSTRACT

A technique for managing storage units involves: if it is determined that a first metadata storage unit for storing metadata of a plurality of storage units fails, allocating a second metadata storage unit for replacing the first metadata storage unit from a storage resource pool, wherein the metadata is read into a memory before the failure occurs, and first metadata of the first metadata storage unit is recorded in configuration information for indicating a valid metadata storage unit; recording second metadata of the second metadata storage unit in the configuration information; storing the metadata in the memory into the second metadata storage unit; and replacing the first metadata storage unit with the second metadata storage unit by validating the second metadata and invalidating the first metadata in the configuration information. Accordingly, such a technique improves reliability of a metadata storage unit.

17 Claims, 5 Drawing Sheets

METHOD, ELECTRONIC DEVICE AND COMPUTER PROGRAM PRODUCT FOR MANAGING STORAGE UNIT

CROSS-REFERENCE TO RELATED APPLICATION

This application claims priority to Chinese Patent Application No. CN202010324002.1, on file at the China National Intellectual Property Administration (CNIPA), having a filing date of Apr. 22, 2020, and having "METHOD, ELECTRONIC DEVICE AND COMPUTER PROGRAM PRODUCT FOR MANAGING STORAGE UNIT" as a title, the contents and teachings of which are herein incorporated by reference in their entirety.

TECHNICAL FIELD

Embodiments of the present disclosure generally relate to the field of data storage, and in particular, to a method, an electronic device, and a computer program product for managing storage units.

BACKGROUND

In a storage system, a physical disk may be divided into a plurality of storage units to serve an upper application. A metadata storage unit may be allocated from the physical disk to store metadata of the plurality of storage units. Metadata of a storage unit may include mapping information of the storage unit to the physical disk, a state (for example, a normal state or a failed state) of the storage unit, and the like.

When the metadata storage unit fails (for example, the physical disk corresponding thereto fails), input/output (I/O) operations for other storage units cannot be normally performed since mapping information of the storage units to the physical disk cannot be obtained. In addition, since states of the other storage units cannot be modified (for example, the normal state is modified to a failed state), the upper application may continue to initiate I/O requests for the storage units, resulting in that a large number of I/O requests are piled up in a to-be-processed queue and cannot be timely processed.

SUMMARY OF THE INVENTION

A method, an electronic device, and a computer program product for managing storage units are provided in the embodiments of the present disclosure.

In a first aspect of the present disclosure, a method for managing storage units is provided. The method includes: if it is determined that a first metadata storage unit for storing metadata of a plurality of storage units fails, allocating a second metadata storage unit for replacing the first metadata storage unit from a storage resource pool, wherein the metadata is read into a memory before the failure occurs, and first metadata of the first metadata storage unit is recorded in configuration information indicating a valid metadata storage unit; recording second metadata of the second metadata storage unit in the configuration information; storing the metadata in the memory into the second metadata storage unit; and replacing the first metadata storage unit with the second metadata storage unit by validating the second metadata and invalidating the first metadata in the configuration information.

In a second aspect of the present disclosure, an electronic device is provided. The electronic device includes at least one processing unit and at least one memory. The at least one memory is coupled to the at least one processing unit and stores instructions for execution by the at least one processing unit. When executed by the at least one processing unit, the instructions cause an apparatus to perform actions including: if it is determined that a first metadata storage unit for storing metadata of a plurality of storage units fails, allocating a second metadata storage unit for replacing the first metadata storage unit from a storage resource pool, wherein the metadata is read into a memory before the failure occurs, and first metadata of the first metadata storage unit is recorded in configuration information indicating a valid metadata storage unit; recording second metadata of the second metadata storage unit in the configuration information; storing the metadata in the memory into the second metadata storage unit; and replacing the first metadata storage unit with the second metadata storage unit by validating the second metadata and invalidating the first metadata in the configuration information.

In a third aspect of the present disclosure, a computer program product is provided. The computer program product is tangibly stored in a non-transitory computer storage medium and includes machine-executable instructions. When executed by a device, the machine-executable instructions cause the device to perform any step of the method described according to the first aspect of the present disclosure.

The summary is provided to introduce the choice of concepts in a simplified form, which will be further described in the following Detailed Description. The summary is neither intended to identify key features or necessary features of the present disclosure, nor intended to limit the scope of the present disclosure.

BRIEF DESCRIPTION OF THE DRAWINGS

The above and other objectives, features, and advantages of the present disclosure will become more obvious by describing example embodiments of the present disclosure in more detail with reference to the accompanying drawings. In the example embodiments of the present disclosure, identical reference numerals generally represent identical members.

In the accompanying drawings, identical or corresponding reference numerals represent identical or corresponding parts.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Preferred embodiments of the present disclosure are shown in the accompanying drawings. However, it should be understood that the present disclosure may be implemented in various forms and should not be limited by the embodiments described here. Instead, the embodiments are provided such that the present disclosure is more thorough and complete, and the scope of the present disclosure can be fully conveyed to those skilled in the art.

The term "comprise" and its variants as used herein indicate open inclusion, i.e., "comprising, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As described above, a physical disk may be divided into a plurality of storage units to serve an upper application. A metadata storage unit may be allocated from the physical disk to store metadata of the plurality of storage units. Metadata of a storage unit may include mapping information of the storage unit to the physical disk, a state (for example, a normal state or a failed state) of the storage unit, and the like. When the metadata storage unit fails (for example, the physical disk corresponding thereto fails), input/output (I/O) operations for other storage units cannot be normally performed since mapping information of the storage units to the physical disk cannot be obtained. In addition, since states of the other storage units cannot be modified (for example, the normal state is modified to a failed state), the upper application may continue to initiate I/O requests for the storage units, resulting in that a large number of I/O requests are piled up in a to-be-processed queue and cannot be timely processed.

A solution for managing storage units is proposed in the embodiments of the present disclosure to solve the above problems and one or more of other potential problems. In the solution, if it is determined that a first metadata storage unit for storing metadata of a plurality of storage units fails, a second metadata storage unit for replacing the first metadata storage unit is allocated from a storage resource pool. The metadata of the plurality of storage units is read into a memory before the failure occurs, and first metadata of the first metadata storage unit is recorded in configuration information for indicating a valid metadata storage unit. Second metadata of the second metadata storage unit may be recorded in the configuration information, and the metadata in the memory may be stored in the second metadata storage unit. Then, the first metadata storage unit is replaced with the second metadata storage unit by validating the second metadata and invalidating the first metadata in the configuration information.

In this way, the solution can effectively improve reliability of a metadata storage unit and avoid the problem that I/O operations for other storage units cannot be normally performed due to a failure in the metadata storage unit. In addition, according to the solution, storage units that may fail can be timely identified, and states of the storage units can be set in the metadata storage unit, thus avoiding the problem that a large number of I/O requests for the storage units are piled up in a to-be-processed queue and cannot be timely processed.

Figure 1:
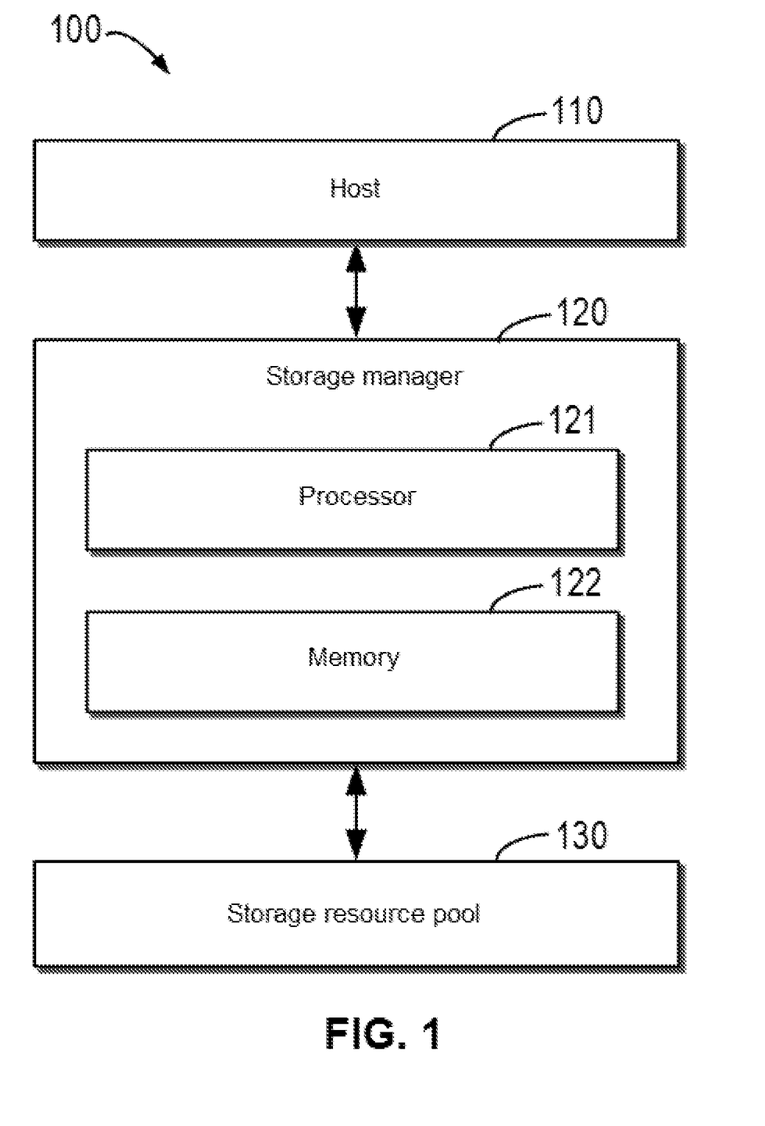
FIG. 1 is a block diagram of an example environment in which an embodiment of the present disclosure can be implemented.

FIG. 1 is a block diagram of example environment 100 in which an embodiment of the present disclosure can be implemented. As shown in FIG. 1, environment 100 includes host 110, storage manager 120, and storage resource pool 130. It should be understood that the structure and functions of environment 100 are described by way of example only, without implying any limitations to the scope of the present disclosure. For example, the embodiment of the present disclosure may also be applied to an environment different from environment 100.

Storage resource pool 130 may include one or more physical disks, for example, magnetic disks, optical disks, solid-state disks (SSD), etc. Each physical disk may be divided into a plurality of disk slices. For example, each disk slice may have the same size. A plurality of disk slices distributed on one or more physical disks may be organized into storage units to store data. According to different types of data stored, storage resource pool 130 may include various types of storage units, for example, a storage unit configured to store user data (also referred to as "user data storage unit"), a storage unit configured to store metadata of a plurality of storage units (also referred to as "metadata storage unit"), and so on. Metadata of a storage unit may include mapping information of the storage unit to a physical disk (for example, indicating which disk slices of which physical disks are occupied by the storage unit), a state of the storage unit (for example, a normal state or a failed state), and the like.

Storage manager 120 may include processor 121 and memory 122. Memory 122 may be any volatile storage medium or non-volatile storage medium that is currently known or to be developed in the future, or a combination of the two. Storage manager 120 may be configured to manage storage resource pool 130 and process I/O requests from host 110. Host 110 may be any physical computer, virtual machine, server or the like where a user application is run.

Host 110 may send an I/O request to storage manager 120 to, for example, read data from a target storage unit in storage resource pool 130 and/or write data into the target storage unit, or the like. Metadata of the target storage unit may be stored in the metadata storage unit. In response to receipt of the I/O request from host 110, storage manager 120 may first acquire the metadata of the target storage unit from the metadata storage unit. The metadata may indicate mapping information of the target storage unit to a physical disk, a state of the target storage unit, and the like. If the target storage unit is in a normal state, in response to the I/O request being a read request, storage manager 120 may forward the I/O request to the target storage unit based on the acquired metadata to read data from the target storage unit, and return the read data to host 110. In response to the I/O request being a write request, storage manager 120 may forward the I/O request to the target storage unit based on the acquired metadata to write data into the target storage unit. If the target storage unit is in a failed state, storage manager 120 may not forward the I/O request to the target storage unit.

Figure 2:
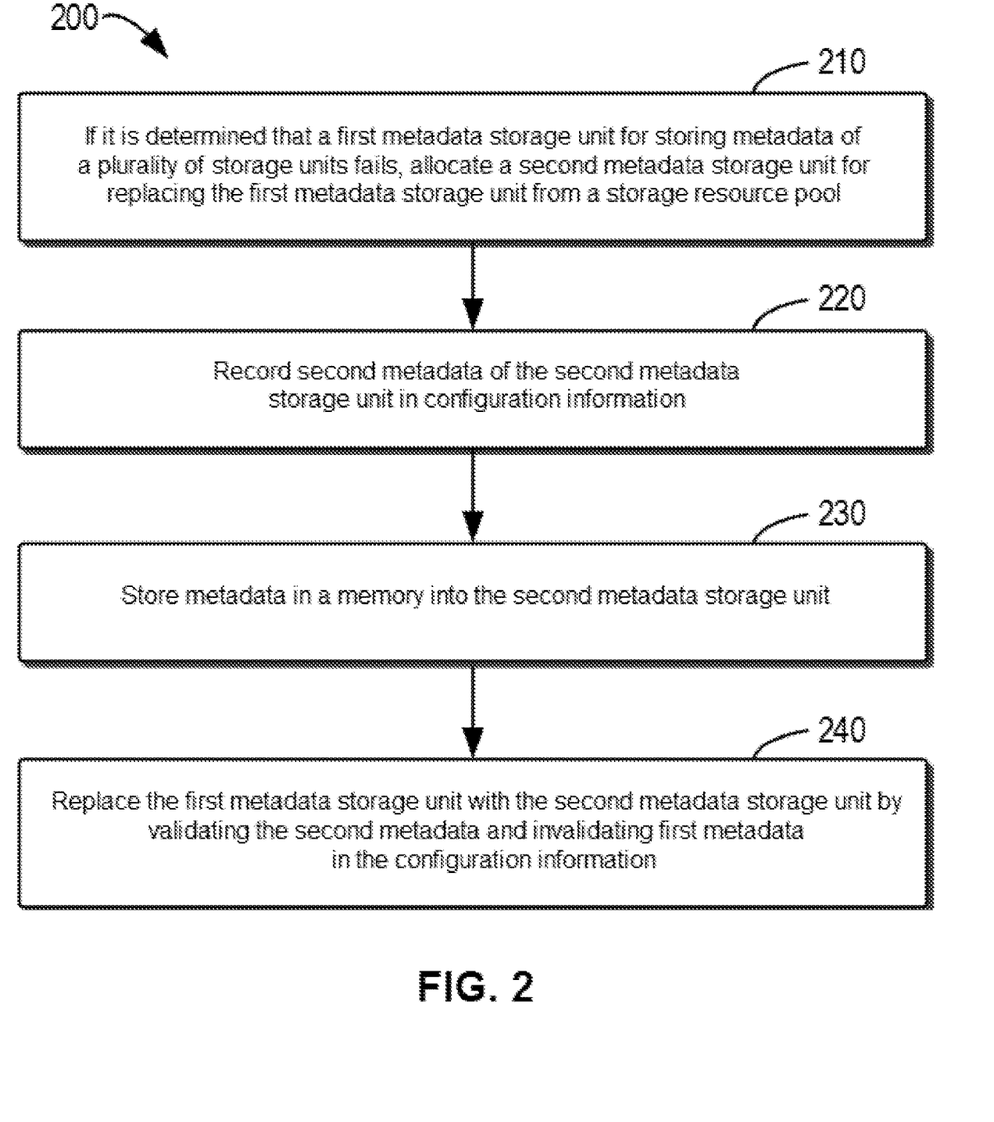
FIG. 2 is a flowchart of an example method for managing storage units according to an embodiment of the present disclosure.

Because of the importance of the metadata storage unit, it is expected that when a metadata storage unit fails (for example, a physical disk corresponding thereto fails), the failed metadata storage unit can be recovered, thus not affecting normal I/O operations. FIG. 2 is a flowchart of example method 200 for managing storage units according to an embodiment of the present disclosure. Method 200 may be performed by, for example, storage manager 120 (for example, processor 121) as shown in FIG. 1. It should be understood that method 200 may also include additional actions not shown and/or omit the actions shown, and the scope of the present disclosure is not limited in this regard. Method 200 is described in detail below with reference to FIG. 1.

As shown in FIG. 2, in block 210, if it is determined that a first metadata storage unit for storing metadata of a plurality of storage units fails, storage manager 120 allocates a second metadata storage unit for replacing the first metadata storage unit from storage resource pool 130.

In some embodiments, storage resource pool 130 may include a plurality of disks, and each of the disks is divided into a plurality of disk slices. The first metadata storage unit may include a first set of disk slices from a first set of disks in the plurality of disks. In order to allocate the second metadata storage unit, storage manager 120 may determine, from the plurality of disks, a second set of disks different from the first set of disks, and allocate a second set of idle disk slices from the second set of disks to serve as the second metadata storage unit.

Figure 3:
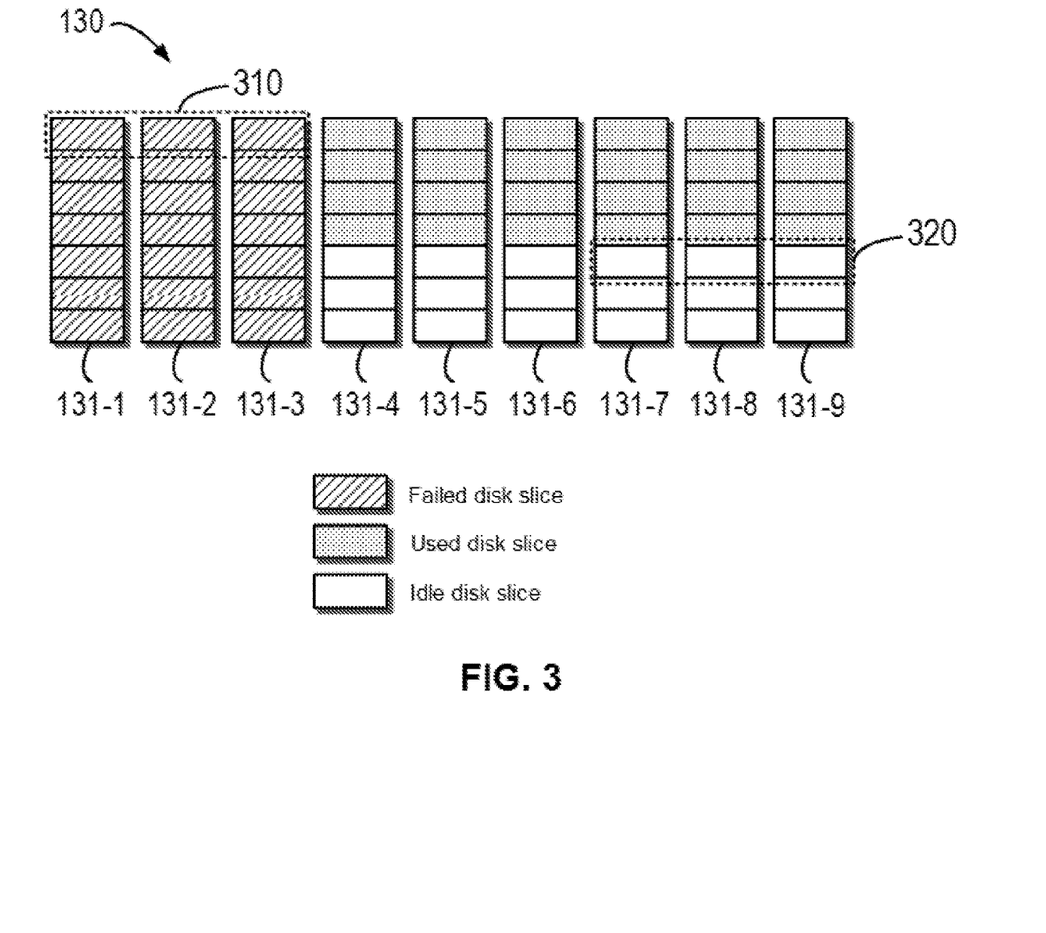
FIG. 3 is a schematic diagram of allocation of a metadata storage unit from a storage resource pool according to an embodiment of the present disclosure.

FIG. 3 is a schematic diagram of allocation of a metadata storage unit from a storage resource pool according to an embodiment of the present disclosure. As shown in FIG. 3, storage resource pool 130 may include, for example, disks 131-1, 131-2, . . . , and 131-9 (collectively or individually referred to as "disk 131"). Each disk 131 may be divided into a plurality of disk slices. First metadata storage unit 310 may include a first set of disk slices from a first set of disks 131-1, 131-2, and 131-3. Since disks 131-1, 131-2, and 131-3 fail, metadata storage unit 310 is also caused to fail. Storage manager 120 may select, from the plurality of disks 131, a second set of disks 131-7, 131-8, and 131-9 different from the first set of disks 131-1, 131-2, and 131-3, and allocate a second set of idle disk slices from the second set of disks 131-7, 131-8, and 131-9 to serve as second metadata storage unit 320, so as to replace failed first metadata storage unit 310.

In some embodiments, the metadata of the plurality of storage units stored by first metadata storage unit 310 may be read into memory 122 before the failure occurs. The metadata of first metadata storage unit 310 itself (herein referred to as "first metadata") may be stored in global configuration information. The global configuration information may be stored in a fixed position of each disk 131 in storage resource pool 130 to indicate a valid metadata storage unit. The first metadata may be used to record corresponding positions of the first set of disk slices allocated to first metadata storage unit 310 in the plurality of disks 131. In this way, the global configuration information can be acquired from at least one of the plurality of disks 131, so as to determine positions of disk slices corresponding to the valid metadata storage unit.

Referring back to FIG. 2, in block 220, storage manager 120 records metadata (herein referred to as "second metadata") of the second metadata storage unit in the configuration information.

In some embodiments, as shown in FIG. 3, in response to second metadata storage unit 320 being allocated, storage manager 120 may generate the second metadata to record corresponding positions of the second set of disk slices allocated to second metadata storage unit 320 in the plurality of disks 131. Storage manager 120 may record the generated second metadata in the global configuration information.

Figure 4:
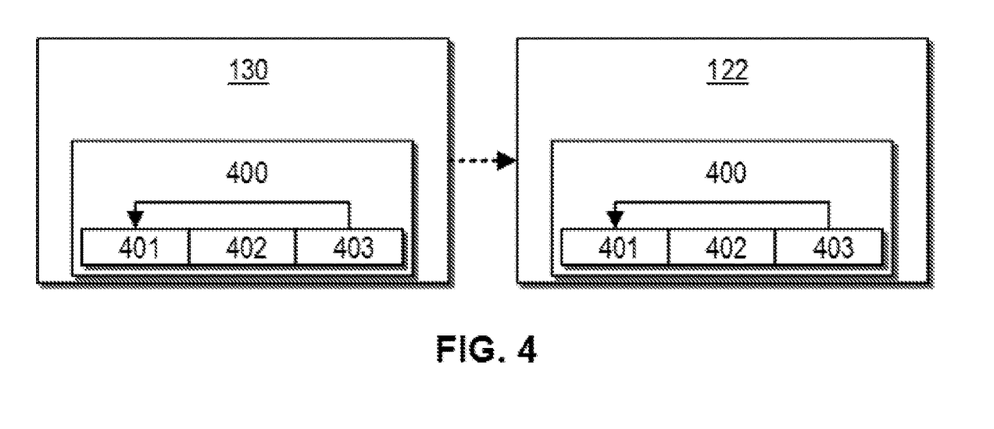
FIG. 4 is a schematic diagram of recording of second metadata in configuration information indicating a valid metadata storage unit according to an embodiment of the present disclosure.

FIG. 4 is a schematic diagram of recording of second metadata in configuration information indicating a valid metadata storage unit according to an embodiment of the present disclosure. As shown in FIG. 4, global configuration information 400 indicating a valid metadata storage unit is stored in, for example, each disk of storage resource pool 130. Configuration information 400 may include at least entries 401 and 402 for recording metadata and flag 403 indicating that one of entries 401 and 402 is valid. In an initial case, for example, first metadata of first metadata storage unit 310 is recorded in entry 401 and flag 403 indicates that entry 401 is valid, that is, first metadata storage unit 310 is a valid metadata storage unit. In order to record second metadata of second metadata storage unit 320 in global configuration information 400, as shown in FIG. 4, storage manager 120 may read configuration information 400 from at least one disk 131 in storage resource pool 130 into memory 122, and record the second metadata of second metadata storage unit 320 in entry 402. Alternatively, if the first metadata of first metadata storage unit 310 is recorded in entry 402 and flag 403 indicates that entry 402 is valid, storage manager 120 may record the second metadata of second metadata storage unit 320 in entry 401.

Referring back to FIG. 2, in block 230, storage manager 120 stores the metadata in the memory into the second metadata storage unit. As described above, the metadata of the plurality of storage units stored by first metadata storage unit 310 may be read into memory 122 before the failure occurs. In some embodiments, storage manager 120 may store the metadata in memory 122 into allocated second metadata storage unit 320.

In block 240, storage manager 120 replaces the first metadata storage unit with the second metadata storage unit by validating the second metadata and invalidating the first metadata in the configuration information.

Figure 5:
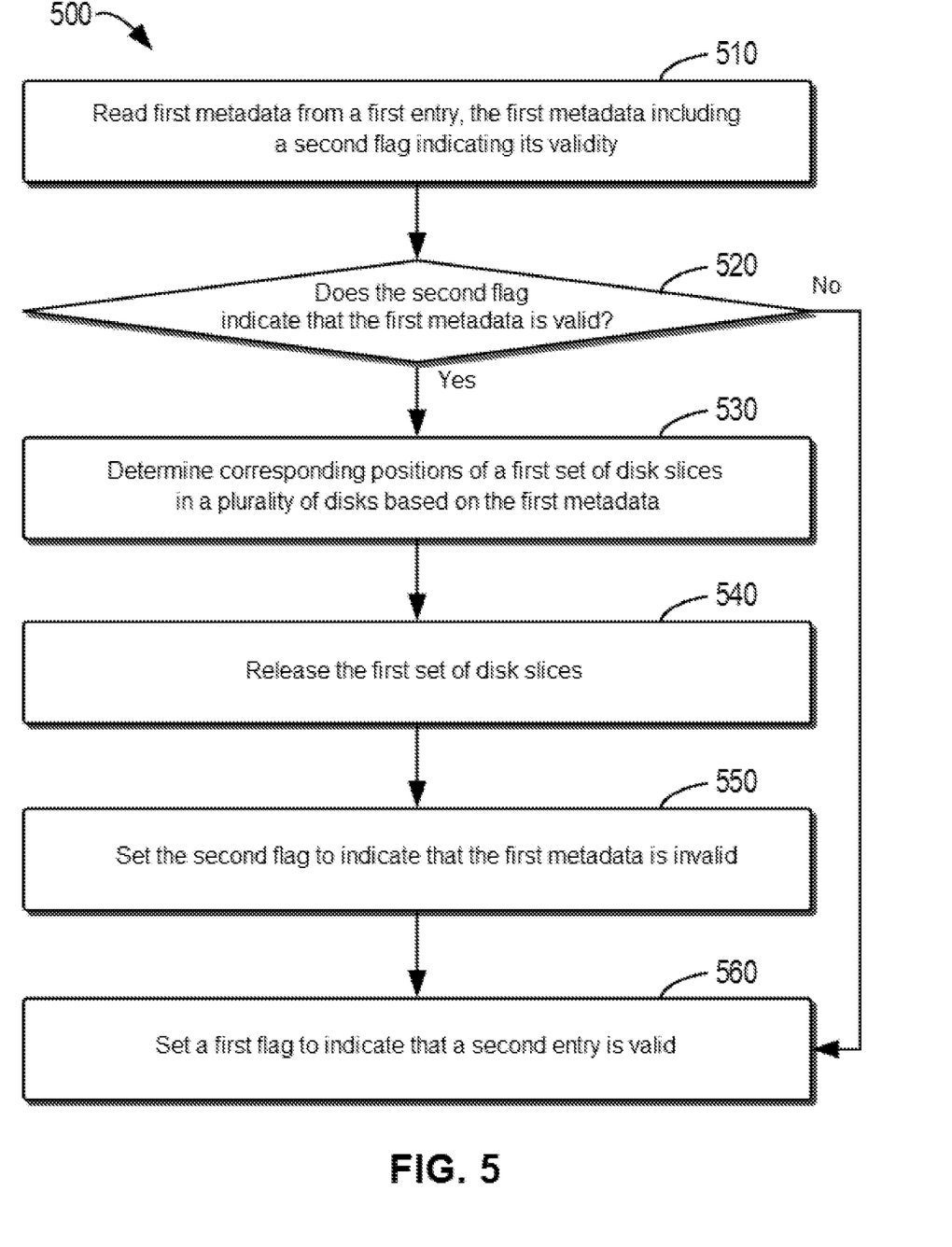
FIG. 5 is a flowchart of an example method for validating second metadata and invalidating first metadata in configuration information according to an embodiment of the present disclosure.

As shown in FIG. 4, the first metadata of first metadata storage unit 310 is stored in, for example, entry 401 (hereinafter also referred to as "first entry") of configuration information 400, the second metadata of second metadata storage unit 320 is stored in, for example, entry 402 (hereinafter also referred to as "second entry") of configuration information 400, and flag 403 (hereinafter also referred to as "first flag") indicates that entry 401 is valid. FIG. 5 is a flowchart of example method 500 for validating second metadata and invalidating first metadata in configuration information according to an embodiment of the present disclosure. Method 500 may be regarded as an example implementation of block 240 as shown in FIG. 2. Method 500 is described below with reference to FIG. 4.

As shown in FIG. 5, in block 510, if determining that first flag 403 indicates that first entry 401 is valid, storage manager 120 may read first metadata of first metadata storage unit 310 from first entry 401. In some embodiments, the first metadata may include a flag indicating its validity (herein also referred to as "second flag"). For example, the second flag may be a string of numbers, also referred to as "magic numbers," inserted into a fixed position (for example, a starting position) of the first metadata. If the magic numbers are a predetermined value, it may indicate that the first metadata is valid; if the magic numbers are tampered with, it may indicate that the first metadata is invalid.

In block 520, storage manager 120 determines, based on the second flag (that is, the magic numbers in the first metadata), whether the first metadata is valid. If the first metadata is valid, in block 530, storage manager 120 determines, based on the first metadata, corresponding positions of a first set of disk slices allocated to first metadata storage unit 310 in a plurality of disks 131. Then, in block 540, storage manager 120 releases the first set of disk slices to indicate that the first set of disk slices can be used for subsequent allocation. For example, storage manager 120 may modify metadata of the first set of disk slices to indicate that the first set of disk slices are idle disk slices. Metadata of a disk slice (for example, indicating that the disk slice is idle or occupied) may be stored, for example, as a part of metadata of a storage unit, in the corresponding metadata storage unit (for example, second metadata storage unit 320) and memory 122. In response to the first set of disk slices being released, in block 550, storage manager 120 sets the second flag to indicate that the first metadata is invalid. For example, storage manager 120 may modify the magic numbers in the first metadata to indicate that the first metadata is invalid. In response to the first metadata being invalidated, in block 560, storage manager 120 sets first flag 403 in configuration information 400 to indicate that second entry 402 for storing the second metadata is valid. If storage manager 120 determines that the first metadata is invalid in block 520, method 500 may directly proceed to block 560.

Figure 6:
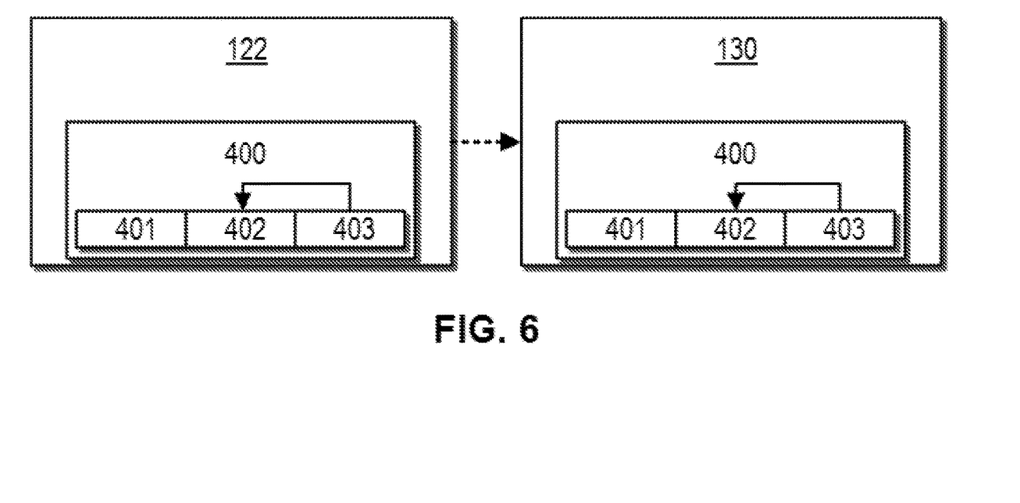
FIG. 6 is a schematic diagram of setting of a flag in configuration information to indicate that second metadata is valid according to an embodiment of the present disclosure.

FIG. 6 is a schematic diagram of setting of a flag in configuration information to indicate that second metadata is valid according to an embodiment of the present disclosure. As shown in FIG. 6, storage manager 120 may set, in memory 122, flag 403 in configuration information 400 to indicate that entry 402 is valid. Then, storage manager 120 may store configuration information 400 in memory 122 in each disk of storage resource pool 130. By storing the configuration information indicating that the second metadata of second metadata storage unit 320 is valid in each physical disk, storage manager 120 replaces failed first metadata storage unit 310 with second metadata storage unit 320. In this way, a failed metadata storage unit can be recovered, thus avoiding the problem that I/O operations for other storage units cannot be normally performed due to a failure in the metadata storage unit.

In some embodiments, storage manager 120 may further determine a storage unit associated with the failed first set of disks (for example, disks 131-1, 131-2, and 131-3 shown in FIG. 3). Storage manager 120 may modify metadata of a storage unit in memory 122 to indicate that the determined storage unit fails, and then save the modified metadata in second metadata storage unit 320. In this way, when host 110 sends to storage manager 120 an I/O request for a storage unit associated with a failed disk, storage manager 120 may determine according to the metadata of the storage unit that the storage unit is in a failed state. In this case, storage manager 120 may not forward the I/O request to the storage unit, thus avoiding the problem that a large number of I/O requests are piled up in a to-be-processed queue and cannot be timely processed.

It can be seen from the above description that a solution for managing storage units is proposed in the embodiments of the present disclosure. The solution can effectively improve reliability of a metadata storage unit and avoid the problem that I/O operations for other storage units cannot be normally performed due to a failure in the metadata storage unit. In addition, according to the solution, storage units that may fail can be timely identified, and states of the storage units can be set in the metadata storage unit, thus avoiding the problem that a large number of I/O requests for the storage units are piled up in a to-be-processed queue and cannot be timely processed.

Figure 7:
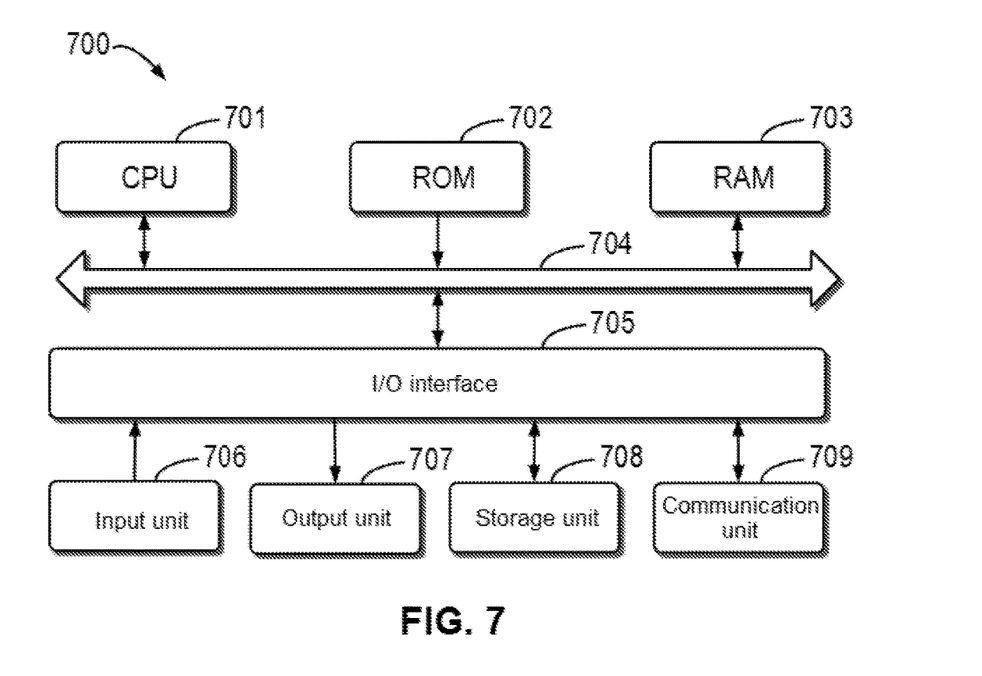
FIG. 7 is a schematic block diagram of an example device that can be configured to implement an embodiment of the present disclosure.

FIG. 7 is a schematic block diagram of example device 700 that can be configured to implement an embodiment of the present disclosure. For example, storage manager 120 as shown in FIG. 1 may be implemented by device 700. As shown in FIG. 7, device 700 includes central processing unit (CPU) 701 that may perform various appropriate actions and processing according to computer program instructions stored in read-only memory (ROM) 702 or computer program instructions loaded from storage unit 708 to random access memory (RAM) 703. In RAM 703, various programs and data required for the operation of device 700 may also be stored. CPU 701, ROM 702, and RAM 703 are connected to each other through bus 704. Input/output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices over a computer network such as the Internet and/or various telecommunication networks.

The various processes and processing described above, for example, method 200 and/or method 500, may be performed by processing unit 701. For example, in some embodiments, method 200 and/or method 500 may be implemented as a computer software program that is tangibly included in a machine-readable medium such as storage unit 708. In some embodiments, some or all of the computer program may be loaded and/or installed onto device 700 through ROM 702 and/or communication unit 709. When the computer program is loaded into RAM 703 and executed by CPU 701, one or more actions of method 200 and/or method 500 described above may be implemented.

The present disclosure may be a method, an apparatus, a system, and/or a computer program product. The computer program product may include a computer-readable storage medium with computer-readable program instructions for performing various aspects of the present disclosure loaded thereon.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium as used herein is not explained as transient signals themselves, such as radio waves or other electromagnetic waves propagated freely, electromagnetic waves propagated through waveguides or other transmission media (e.g., light pulses propagated through fiber-optic cables), or electrical signals transmitted over electrical wires.

The computer-readable program instructions described here may be downloaded from the computer-readable storage medium to various computing/processing devices or downloaded to external computers or external storage devices over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, including object-oriented programming languages such as Smalltalk and C++, as well as conventional procedural programming languages such as the "C" language or similar programming languages. The computer-readable program instructions may be executed completely on a user's computer, executed partially on a user's computer, executed as a separate software package, executed partially on a user's computer and partially on a remote computer, or executed completely on a remote computer or a server. In the case where a remote computer is involved, the remote computer may be connected to a user's computer over any kind of networks, including a local area network (LAN) or a wide area network (WAN), or may be connected to an external computer (e.g., connected over the Internet using an Internet service provider). In some embodiments, an electronic circuit, such as a programmable logic circuit, a field programmable gate array (FPGA), or a programmable logic array (PLA), may be customized by utilizing state information of computer-readable program instructions. The electronic circuit can execute the computer-readable program instructions to implement various aspects of the present disclosure.

Various aspects of the present disclosure are described here with reference to flowcharts and/or block diagrams of the method, apparatus (system), and computer program product according to the embodiments of the present disclosure. It should be understood that each block in the flowcharts and/or block diagrams and a combination of blocks in the flowcharts and/or block diagrams may be implemented by computer-readable program instructions.

The computer-readable program instructions may be provided to a processing unit of a general-purpose computer, a special-purpose computer, or another programmable data processing apparatus to produce a machine, such that the instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium, and the instructions cause a computer, a programmable data processing apparatus, and/or other devices to work in a specific manner, such that the computer-readable medium storing the instructions includes an article of manufacture that includes instructions for implementing various aspects of functions/actions specified in one or more blocks in the flowcharts and/or block diagrams.

The computer-readable program instructions may also be loaded onto a computer, another programmable data processing apparatus, or another device, such that a series of operational steps are performed on the computer, another programmable data processing apparatus, or another device to produce a computer-implemented process. As such, the instructions executed on the computer, another programmable data processing apparatus, or another device implement the functions/actions specified in one or more blocks in the flowcharts and/or block diagrams.

The flowcharts and block diagrams in the accompanying drawings illustrate architectures, functions, and operations of possible implementations of systems, methods, and computer program products according to multiple embodiments of the present disclosure. In this regard, each block in the flowcharts or block diagrams may represent a module, a program segment, or a portion of an instruction that includes one or more executable instructions for implementing specified logical functions. In some alternative implementations, functions labeled in the blocks may occur in an order different from that labeled in the accompanying drawing. For example, two successive blocks may actually be performed basically in parallel, or they may be performed in an opposite order sometimes, depending on the functions involved. It should also be noted that each block in the block diagrams and/or flowcharts and a combination of blocks in the block diagrams and/or flowcharts may be implemented using a dedicated hardware-based system for executing specified functions or actions, or may be implemented using a combination of dedicated hardware and computer instructions.

Various embodiments of the present disclosure have been described above, and the foregoing description is illustrative rather than exhaustive, and is not limited to the disclosed various embodiments. Numerous modifications and changes are apparent to those of ordinary skill in the art without departing from the scope and spirit of the illustrated various embodiments. The selection of terms as used herein is intended to best explain the principles and practical applications of the various embodiments or the improvements to technologies on the market, or to enable other persons of ordinary skill in the art to understand the embodiments disclosed herein.

The invention claimed is:

1. A method for managing storage units, comprising:
if it is determined that a first metadata storage unit storing metadata of a plurality of storage units fails, allocating a second metadata storage unit to replace the first metadata storage unit from a storage resource pool, wherein the metadata of the plurality of storage units is read into a memory before the failure occurs, and first metadata of the first metadata storage unit is recorded in configuration information indicating a valid metadata storage unit, wherein the storage resource pool comprises a plurality of disks, wherein each one of the disks is divided into a plurality of disk slices, and wherein the metadata of the plurality of storage units includes mapping information indicating which ones of the plurality of disk slices located on the disks in the storage resource pool are occupied by each individual one of the plurality of storage units;
recording second metadata of the second metadata storage unit in the configuration information;
storing the metadata of the plurality of storage units in the memory into the second metadata storage unit; and
replacing the first metadata storage unit with the second metadata storage unit by validating the second metadata and invalidating the first metadata in the configuration information.

2. The method of claim 1, wherein the first metadata storage unit comprises a first set of disk slices from a first set of disks in the plurality of disks, and allocating the second metadata storage unit from the storage resource pool comprises:
selecting, from the plurality of disks, a second set of disks different from the first set of disks; and
allocating a second set of disk slices from the second set of disks to serve as the second metadata storage unit.

3. The method of claim 2, wherein the first metadata records corresponding positions of the first set of disk slices in the plurality of disks, and recording the second metadata in the configuration information comprises:
generating the second metadata to record corresponding positions of the second set of disk slices in the plurality of disks; and
recording the generated second metadata in the configuration information.

4. The method of claim 2, wherein the configuration information is stored on at least one of the plurality of disks, and recording the second metadata in the configuration information comprises:
reading the configuration information from the at least one disk into the memory; and
recording the second metadata in the configuration information in the memory.

5. The method of claim 4, further comprising:
storing the configuration information in the memory into the at least one disk in response to the second metadata in the configuration information being validated and the first metadata being invalidated.

6. The method of claim 2, wherein the configuration information comprises a first entry for recording the first metadata, a second entry for recording the second metadata, and a first flag indicating that the first entry is valid, and validating the second metadata and invalidating the first metadata in the configuration information comprises:
reading the first metadata from the first entry, the first metadata comprising a second flag indicating whether the first metadata is valid;
if the second flag indicates that the first metadata is valid,
determining corresponding positions of the first set of disk slices in the plurality of disks based on the first metadata;
releasing, based on the corresponding positions, the first set of disk slices allocated to the first metadata storage unit; and
setting the second flag to indicate that the first metadata is invalid; and
if the second flag indicates that the first metadata is invalid, setting the first flag to indicate that the second entry is valid.

7. The method of claim 1, wherein the configuration information comprises a first entry and a second entry for recording metadata and a first flag indicating whether either the first entry or the second entry is valid, and recording the second metadata in the configuration information comprises:
recording the second metadata in the second entry if the first flag indicates that the first entry is valid; and
recording the second metadata in the first entry if the first flag indicates that the second entry is valid.

8. The method of claim 1, wherein the metadata of the plurality of storage units further indicates corresponding states of the plurality of storage units, and the method further comprises:
determining a storage unit associated with the first set of disks from the plurality of storage units;
if it is determined that the storage unit fails, modifying the metadata of the plurality of storage units in the memory to indicate that the storage unit fails; and
storing the modified metadata of the plurality of storage units in the second metadata storage unit.

9. An electronic device, comprising:
at least one processing unit; and
at least one memory coupled to the at least one processing unit and storing instructions for execution by the at least one processing unit, wherein when executed by the at least one processing unit, the instructions cause the electronic device to perform actions comprising:
if it is determined that a first metadata storage unit storing metadata of a plurality of storage units fails, allocating a second metadata storage unit to replace the first metadata storage unit from a storage resource pool, wherein the metadata of the plurality of storage units is read into a memory before the failure occurs, and first metadata of the first metadata storage unit is recorded in configuration information indicating a valid metadata storage unit, wherein the storage resource pool comprises a plurality of disks, wherein each one of the disks is divided into a plurality of disk slices, and wherein the metadata of the plurality of storage units includes mapping information indicating which ones of the plurality of disk slices located on the disks in the storage resource pool are occupied by each individual one of the plurality of storage units;
recording second metadata of the second metadata storage unit in the configuration information;
storing the metadata of the plurality of storage units in the memory into the second metadata storage unit; and
replacing the first metadata storage unit with the second metadata storage unit by validating the second metadata and invalidating the first metadata in the configuration information.

10. The electronic device of claim 9, wherein the first metadata storage unit comprises a first set of disk slices from a first set of disks in the plurality of disks, and allocating the second metadata storage unit from the storage resource pool comprises:

selecting, from the plurality of disks, a second set of disks different from the first set of disks; and allocating a second set of disk slices from the second set of disks to serve as the second metadata storage unit.

11. The electronic device of claim 10, wherein the first metadata records corresponding positions of the first set of disk slices in the plurality of disks, and recording the second metadata in the configuration information comprises:

generating the second metadata to record corresponding positions of the second set of disk slices in the plurality of disks; and recording the generated second metadata in the configuration information.

12. The electronic device of claim 10, wherein the configuration information is stored on at least one of the plurality of disks, and recording the second metadata in the configuration information comprises:

reading the configuration information from the at least one disk into the memory; and recording the second metadata in the configuration information in the memory.

13. The electronic device of claim 12, wherein the actions further comprise:

storing the configuration information in the memory into the at least one disk in response to the second metadata in the configuration information being validated and the first metadata being invalidated.

14. The electronic device of claim 10, wherein the configuration information comprises a first entry for recording the first metadata, a second entry for recording the second metadata, and a first flag indicating that the first entry is valid, and validating the second metadata and invalidating the first metadata in the configuration information comprises:

reading the first metadata from the first entry, the first metadata comprising a second flag indicating whether the first metadata is valid;

if the second flag indicates that the first metadata is valid, determining corresponding positions of the first set of disk slices in the plurality of disks based on the first metadata;

releasing, based on the corresponding positions, the first set of disk slices allocated to the first metadata storage unit; and setting the second flag to indicate that the first metadata is invalid; and if the second flag indicates that the first metadata is invalid, setting the first flag to indicate that the second entry is valid.

15. The electronic device of claim 9, wherein the configuration information comprises a first entry and a second entry for recording metadata and a first flag indicating whether either the first entry or the second entry is valid, and recording the second metadata in the configuration information comprises:

recording the second metadata in the second entry if the first flag indicates that the first entry is valid; and recording the second metadata in the first entry if the first flag indicates that the second entry is valid.

16. The electronic device of claim 9, wherein the metadata of the plurality of storage units further indicates corresponding states of the plurality of storage units, and the actions further comprise:

determining a storage unit associated with the first set of disks from the plurality of storage units;

if it is determined that the storage unit fails, modifying the metadata of the plurality of storage units in the memory to indicate that the storage unit fails; and storing the modified metadata of the plurality of storage units in the second metadata storage unit.

17. A computer program product having a non-transitory computer readable medium which stores a set of instructions to manage storage units; the set of instructions, when carried out by computerized circuitry, causing the computerized circuitry to perform a method of:

if it is determined that a first metadata storage unit storing metadata of a plurality of storage units fails, allocating a second metadata storage unit to replace the first metadata storage unit from a storage resource pool, wherein the metadata of the plurality of storage units is read into a memory before the failure occurs, and first metadata of the first metadata storage unit is recorded in configuration information indicating a valid metadata storage unit, wherein the storage resource pool comprises a plurality of disks, wherein each one of the disks is divided into a plurality of disk slices, and wherein the metadata of the plurality of storage units includes mapping information indicating which ones of the plurality of disk slices located on the disks in the storage resource pool are occupied by each individual one of the plurality of storage units;

recording second metadata of the second metadata storage unit in the configuration information;

storing the metadata in the memory into the second metadata storage unit; and replacing the first metadata storage unit with the second metadata storage unit by validating the second metadata and invalidating the first metadata in the configuration information.

* * * * *